MULTIPLE FREQUENCY TELEGRAPH SYSTEM

Filed May 13, 1947 3 Sheets-Sheet 1

INVENTOR
LUCIEN DEVAUX
BY Robert Harding Jr
ATTORNEY

INVENTOR
LUCIEN DEVAUX
BY Robert Harding Jr.
ATTORNEY

INVENTOR
LUCIEN DEVAUX
BY [signature]
ATTORNEY

Patented Jan. 31, 1950

2,495,705

UNITED STATES PATENT OFFICE 2,495,705

MULTIPLE FREQUENCY TELEGRAPH SYSTEM

Lucien Devaux, Paris, France, assignor to International Standard Electric Corporation, New York, N. Y., a corporation of Delaware Application May 13, 1947, Serial No. 747,698
In France December 18, 1943

Section 1, Public Law 690, August 8, 1946
Patent expires December 18, 1963

11 Claims. (Cl. 178—51)

This application relates to a system for radio transmission of printing telegraph signals, employing the usual five-signal code.

Such systems are confronted with certain difficulties, owing to the fact that strays on the radio channels introduce signals that disturb the transmission. The harmful influence of such strays is reduced to a great degree by employing for the transmission audio frequency carrier currents, the discrimination of which from the strays is possible to a considerable extent. However, for such needful selection to be efficient, it is necessary to employ a long time constant in the selector devices, and this last requirement makes systems of the prior art unsuitable for the transmission of code signals at an acceptable speed, sufficiently great for commercial practice.

In one proposed system, the transmission of various control signals has been effected by means of combinations of frequencies sent simultaneously, since the duration of each letter transmitted may then be made relatively great without affecting the rapidity of the transmission, because the necessary selection times for the various frequencies are then contemporaneous and simultaneous for each complete character received.

The various currents characterized by the corresponding various frequencies are separated at the receiving station by electrical or mechanical selective elements, which latter almost completely cancel the action of the strays and also serve for actuating various operating mechanisms at the receiver.

One such system is characterized by the simultaneous transmission of the code signals by means of several modulation frequencies, one frequency being assigned to each signal, according to the order in which such signal is normally transmitted. The signals of the various frequencies, of variable permutation according to the transmitted character, are separated by frequency selective elements, and they simultaneously actuate corresponding relays, which latter then, in proper sequence, transfer the received signal to the printing mechanism.

The present invention relates to a system and aparatus for adapting a printing telegraph to this just described kind of transmission, in which the different signals are sent by combinations of frequencies which are independent of the ordinary five-signal telegraph code.

One great advantage of the system of this invention is that no synchronism between any moving elements at transmitter and receiver need be maintained. All mechanical movements at the respective stations are completely determined thereat, as to temporal characteristics. The only limitation as to speed of transmission is the predetermined maximum speed at which the relays and distributor at the receiving station can function, but no synchronism of speed is thereby made necessary.

One object of this invention is to provide a printing telegraph system in which a relatively high frequency carrier wave is modulated by combinations of various lower frequency currents, each character to be transmitted serving to produce a predetermined combination of such modulating currents.

Another object of this invention is to reduce the undesirable effect of strays occurring along or picked up by the transmission channel of a printing telegraph system, more especially when such channel is constituted by a radiated high frequency wave.

Yet another object of this invention is to provide a printing telegraph system employing a high frequency carrier wave simultaneously modulated by a plurality of frequencies, and provided with resonance devices at the receiver for separating such modulation frequencies and transforming them into combinations according to the ordinary five-signal telegraph code, these last signals being sequentially fed into an ordinary printing telegraph instrument.

Another object of this invention is to provide a printing telegraph receiver in which simultaneously received code combinations are transformed into sequential code combinations of the ordinary five-signal type.

A further object of the invention is to provide a system having devices for verifying that the reception of a character at the receiving station is correct, by the return transmission of the received character from the receiving station back to the transmitting station.

Reference is now made to the hereunto appended drawings.

Figure 1:
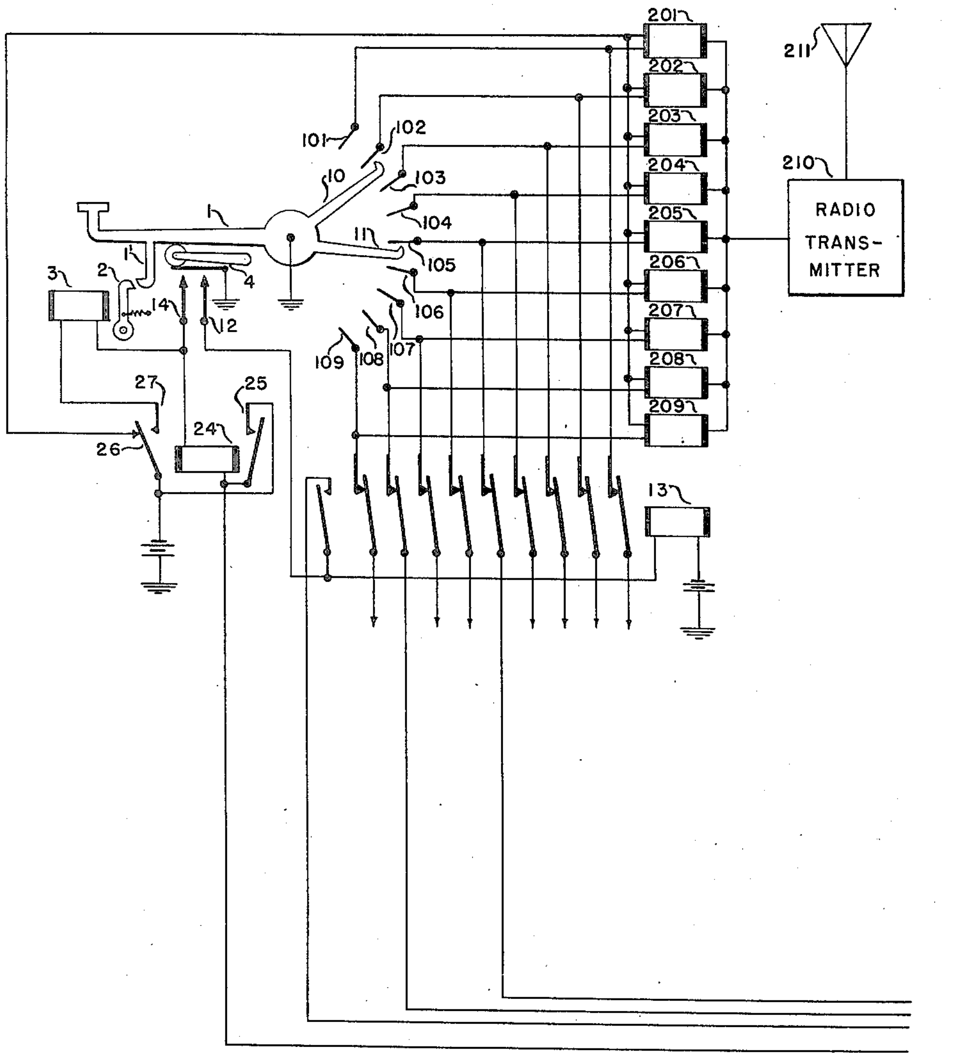
Fig. 1 (A and B) is a schematic representation of a transmitting and receiving station respectively forming a system according to this invention.
Figure 1:
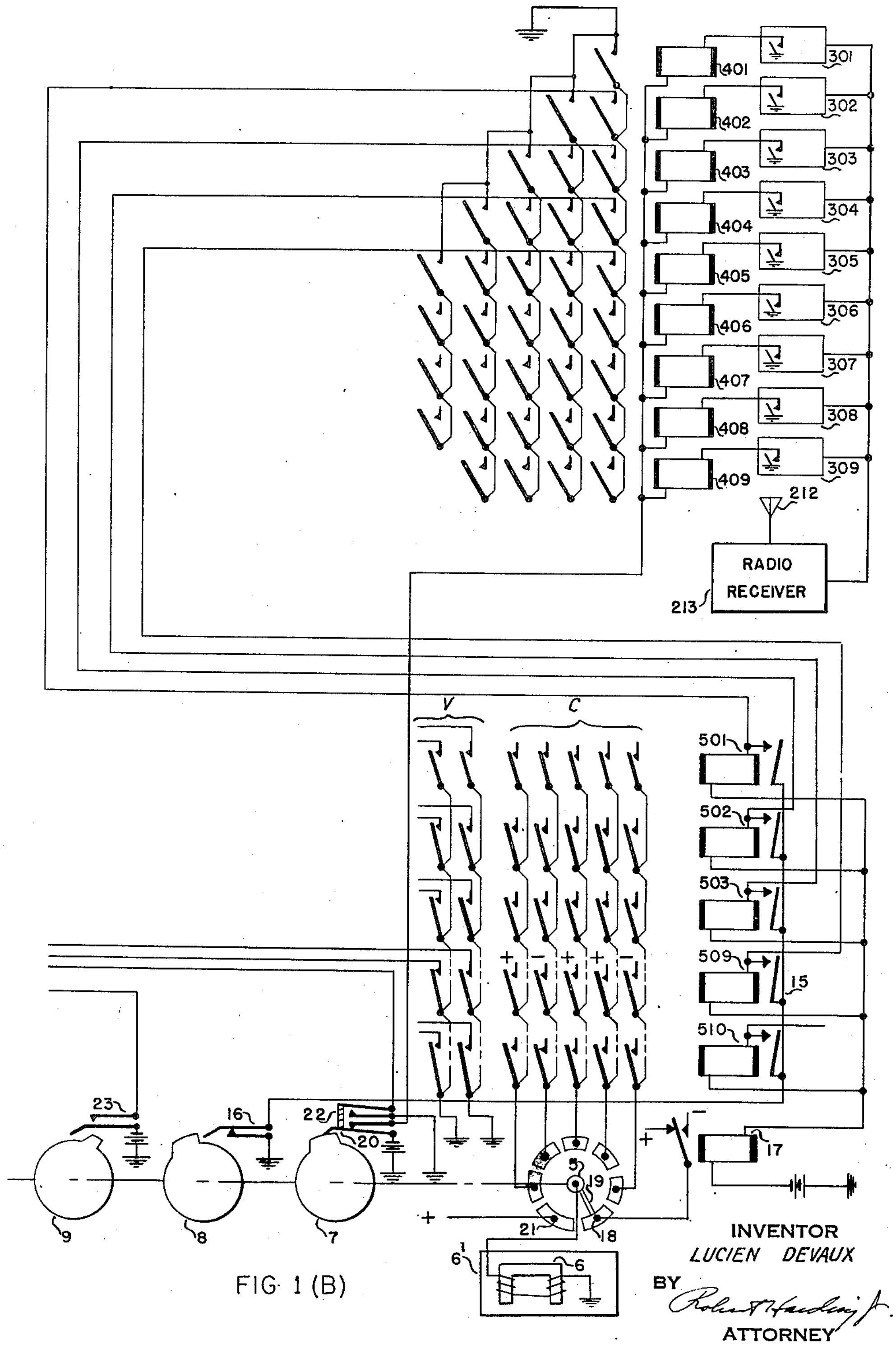

Reference is now made to Fig. 1, in which in the plates A and B the transmitting and receiving portions of a complete station, together with the interconnecting apparatus are shown in sufficient detail clearly to illustrate the present invention. Only a few of the code circuits are shown in complete detail, since the other code circuits are connected exactly in similar fashion and since the representation of the complete connections for all circuits would render the drawing unnecessarily complex and confusing. Likewise, certain well-known elements of a printing telegraph mechanism are schematically indicated, for the same reasons just pointed out. For example, various elements which are connected either to the positive or to the negative main battery, have such connections indicated merely by the appropriate polarity sign.

The transmitter as shown in Fig. 1, A, comprises a keyboard having a number of keys corresponding to the various characters to be transmitted, it being possible for one same key to be common to two characters, by using the well-known letter-figure permutation.

A typical one of these keys is shown at 1. Each key is provided with a locking hook 1′ which in its operating position is engaged by a common hook bar 2, an electromagnet 3 serving for release of the hook. A pivoted lever 4 is actuated by each depressed key and serves to make common contacts, hereinafter described.

The keys serve for effecting combinations of contacts that cause the emission of modulation frequencies by one or more of a plurality of oscillators. The drawing shows, by way of example, a key that makes two contacts 10 and 11 on a set of nine contact bars 101 to 109, connected respectively to oscillators illustrated schematically by the rectangles 201 to 209. The nine oscillators act on a single radio transmitter 210, which generates a predetermined high frequency for the transmission, the system being such that the radio frequency carrier wave is modulated by the frequencies corresponding to the oscillators that are set into action by the contacts of the depressed key. The high frequency waves are transmitted by an antenna 211, or alternatively may be carried along a conductor, such as a high voltage power supply line, or other transmission line.

The receiving wave collector, such as an antenna 212 of the station, is connected to a radio receiver 213, which amplifies and demodulates the received waves, thus changing them to a frequency different from that of the transmitted wave length, and the consequent low frequency currents are sent into selector devices 301 to 309 that serve for discriminating and separating the frequencies, in order to make them act on corresponding selector relays 401 to 409. The separation of the frequencies may be effected electrically by means of resonant circuits or filters, or else mechanically by one of the known devices tuned and responding by resonance with the various frequencies. In either case the reception of a given frequency results in the closing of a corresponding contact by one of the selector units, indicated by rectangles 301 to 309.

The contacts of these last instruments are connected to the auxiliary selector relays 401 to 409, which latter effect combinations of contacts corresponding to the combinations of the keys of the transmitting keyboard. These contact combinations serve for closing the circuit of the same number of character relays 501, 502, 503, 509 and 510, as there are keys of the keyboard. Only a few of these relays are shown in the drawing, for the sake of clarity, it being understood that there is such a relay for each character to be printed.

Each of the character relays carries two series of contacts. A first series of five contacts indicated by the brace C serves for sending to the printing instrument, which will be later described, the combination of the positive and negative currents corresponding to the code of the character to be printed. In the embodiment shown, a second series of two contacts is indicated by the brace V. This latter serves for setting into action two oscillators, for the purpose of the reverse transmission to the corresponding station, by employing the carrier frequencies assigned to the direct transmission, but now proceeding in the reverse direction of the same combination of modulation frequencies as that which has been received on the carrier frequencies used for the original transmission.

The printing receiver is constituted like the conventionally used receiving portion of a teleprinter employing the usual five-signal code, with the addition of the distributor and cams hereinafter described. The printing receiver 6 is of conventional type and is here represented by the rectangle 6′. The extended shaft of the printer carries a distributor 5 that serves for connecting in sequence the polarized electromagnet 6 of the receiver with the contacts of the character relays, so as to cause the desired code to be registered by the instrument, for the correct printing of the transmitted character. Furthermore, this shaft carries three other cams 7, 8, and 9, the respective parts played by which will be later explained.

The general constitution of the system having been thus outlined in order to render it more comprehensible, the detailed elements and operation thereof are now described.

It is to be noted that the number of frequencies necessary for making up as many combinations as there are different signs to be transmitted may vary, depending upon whether merely the two-frequency combinations are employed or whether combinations of two, three or four frequencies are alternatively used.

By the use of nine frequencies, for example, it is possible to have 36 combinations of frequencies grouped in pairs. This particular example has been selected and is illustrated in the drawing. Out of the 36 combinations, 29 are employed, for example in the following manner. Two combinations are used for the shift passage from letters to figures and from figures to letters, as well known in the art, one combination for the figure or letter spacing and 26 combinations serve for the 26 letters of the alphabet, each of these 26 combinations also serving for a single sign of the shift class including figures, punctuation marks, etc. The number of different characters may accordingly be 52, which is more than sufficient to meet transmission requirements in any occidental alphabet.

With the use of 7 frequencies and combinations of both 2 and 3 frequencies, 30 letter combinations may be obtained.

Assuming that the operator at a station A, such as here illustrated, has to transmit to a substantially identical station B the letter "F," characterized, for example, by the sending of the frequencies 2 and 5 and by the conventional code +−++−; he depresses the key 1, assumed to be marked by and to correspond to this character. The hook of the key is engaged by the bar 2, and this action keeps the key depressed.

Several contacts are closed, first of all the contacts 102 and 105, which respectively set into action the corresponding oscillators 202 and 205. The frequencies 2 and 5 are accordingly sent to the transmitter 210 in order to modulate the carrier wave at the transmission frequency passing from station A to station B.

At the same time, the lever 4 closes contact 12, which excites relay 13, one purpose of which latter is to open the connections between the oscillators and the V contacts of the character relays. For purposes of clarity only a few such contacts and connections to the multiple armatures of relay 13 are here shown, it being understood that a full set of each of these elements is employed in practice. Lever 4 furthermore closes contact 14, which latter plays no further part at this moment.

The modulated waves are sent by the transmitter, either by radiation or over physical transmission conductors such as high voltage line, in which latter case suitable coupling connections well known in the art are of course employed. The waves reach the radio receiver of the corresponding station B, which is substantially identical with station A, where they are demodulated and the two frequencies 2 and 5 are sent to the selector devices 301 to 309. At the end of a predetermined time interval that varies with the efficiency of the selection, which latter to be satisfactory requires an appreciable time constant, the two selection devices 302 and 305 close their respective contacts, and this excites corresponding selector relays 402 and 405. Rapidly actuated holding relays, as well known in the art, may, if necessary, be added between the contacts of the selector devices and the relays, in case that the contacts made by the selectors are of too brief duration to effect direct operation of the relays, which latter are necessarily slow, on account of their great number of contact springs. The circuit of relay 509 is closed via one of the contacts of 402, in series with another contact of 405 to ground, and this relay 509 then closes its seven contacts. The five C contacts send to the segments of distributor 5 the combinations of the five-signal code that correspond to the letter "F." Relay 509 locks electrically, by actuating contact 15, in series with contact 16 of cam 8.

Relay 17, which is inserted in the common circuit of the character relays, operates at the same time, and sends the negative current acting as a start signal to segment 18 of the distributor, against which brush 19 bears, when in the resting position. The negative current reaches the teleprinter polarized electromagnet 6 and simultaneously clutches in the shaft, by the conventional clutch device, well known in the art and consequently not here shown. As soon as the shaft begins to rotate, cam 7 opens the common circuit at contact 20, selector relays 402 and 405 return to their respective resting positions, and no other similar relay can operate during the rotation of the shaft. The arm of the distributor, driven by the latter, passes over the segments in synchronism with the conventional instrument routing device (not shown), the purpose of which latter is to register mechanically the code of the transmitted sign. Since the various segments are connected to the contacts of relay 509, on which the combination of polarities corresponding to the letter "F" is produced, it can be seen that the printing instrument receives the impulses needed for printing the letter "F." The last segment, 21, sends the positive current corresponding to the conventional finish signal for bringing back electromagnet 6 to its normal position. At this moment, contact 20, operated by cam 7, is again closed and contact 16 is opened momentarily, and this latter brings back relays 509 and 17 to the resting position. Relay 509 also closes the circuit of the oscillators 202 and 205 via the V contacts and the contacts of relay 13 which are now in the resting position, so that the transmitter of station B sends a check transmission signal from B to A, comprising a carrier modulated at the frequencies 2 and 5. The radio receiver of station A receives and demodulates these waves and, while the printer of station B carries out the operations that lead to the printing of the letter "F," the selector devices 302 and 305 at station A close the circuits of relays 402 and 405, and relay 509 is energized. This results in the printing at station A of the same character that has been received at station B.

However, care must be taken to prevent renewed operation of relay 509 of station A from continuing to send the frequencies 2 and 5. This would lead to indefinite closed loop action, also termed retroactive mutual reciprocative operation, analogous to the "singing" of a telephone loop. This is the purpose for which relay 13 serves. Relay 13, which is energized as soon as a key is depressed, and which holds up via contact 22 of cam 7 as soon as the receiver begins to rotate, returns to the resting position when the shaft has completed its rotation, at which moment cam 7 momentarily opens contact 22.

A short instant after the shaft is clutched in, cam 9 momentarily closes contact 23. Relay 24, whose circuit is closed via contact 14, operates and holds up by its locking contact 25, as long as the key 1 remains depressed. The common circuit of the oscillators is opened at contact 26, so that the transmission of the frequencies 2 and 5 ceases immediately, even if the key 1 is kept depressed. Finally, electromagnet 3 is excited via contacts 14 of lever 4 and 27 of relay 24, respectively. The locking bar 2 is attracted and it releases the hook of key 1, which latter can again rise. The circuit of relay 13 is opened at 12, and that of relay 24 and electromagnet 3 is opened at 14.

Relay 509 remains attracted until brush 19 of the distributor has passed over the five sectors that send the code impulses into electromagnet 6. As soon as brush 19 reaches segment 21, relay 509 plays no further part. Cam 8 momentarily opens contact 16 and relays 509 and 17 return to their respective positions.

As soon as key 1 is lifted, another key, or the same key, may be depressed for the transmission of the following sign, but care must be taken to prevent a second character relay at station B from operating, before the distributor brush has passed over the 5 code sending segments. It is for this purpose that the common feed circuit of the selector relays is completed via contact 20, which latter is opened by cam 7, as soon as the shaft of the printer begins its movement, and which contact only closes again when brush 19 reaches segments 21, after having sent to electromagnet 6 the code of the first character to be printed.

When the shaft of the printer has completed its rotation, all elements are back to the initial conditions, and station A is again ready to send or to receive a letter or other character.

Figure 2:
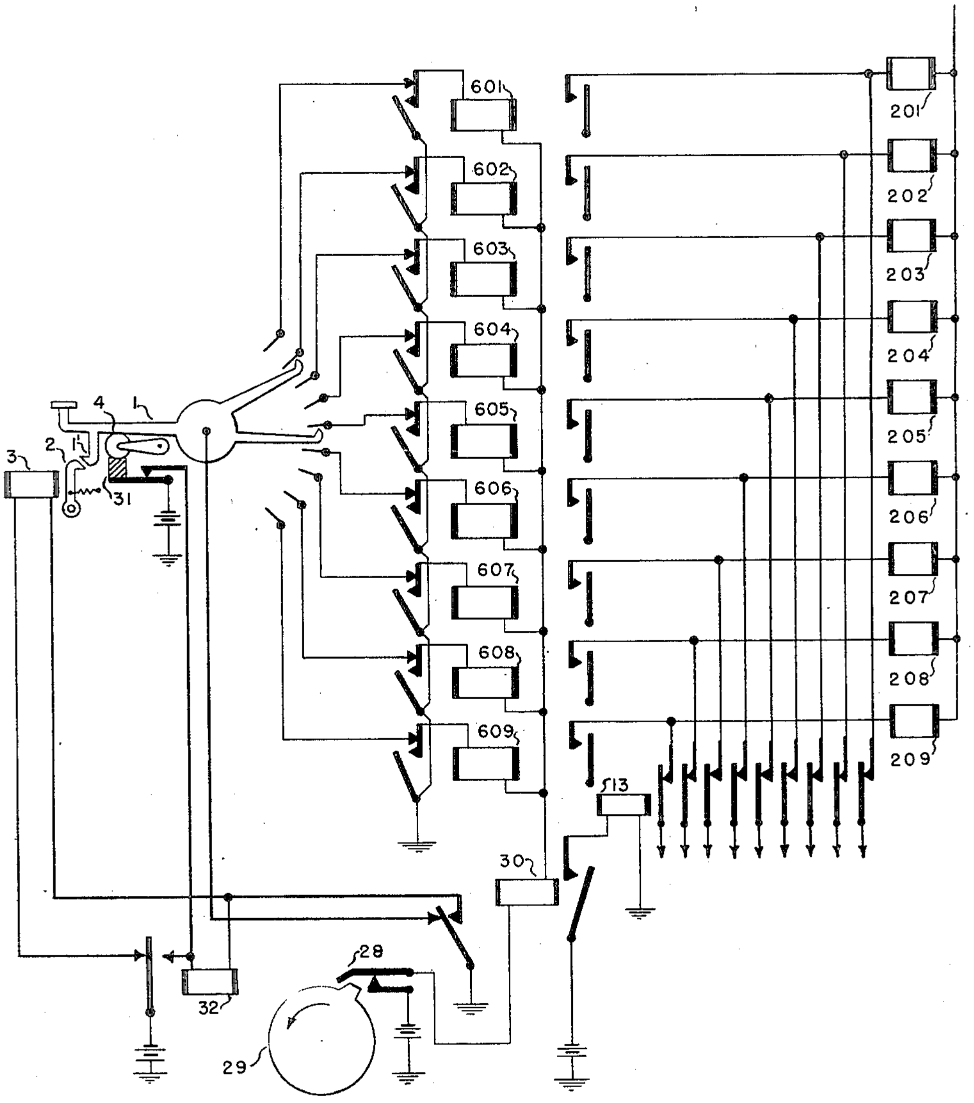
Fig. 2 is a representation of an alternative form of transmitting keyboard and ancillary mechanisms.

The mechanism of the keyboard as just described has one drawback. A depressed key is held locked until the selection has been made, the combination of frequencies sent back, and the shaft of the printing receiver of the transmitting station has begun to rotate. In order to avoid loss of time, the operator has to immediately depress the next key, and this necessitates keying in rhythm. This disadvantageous requirement may be avoided by a slight complication consisting of the addition to the device already described, of registering relays between the contacts of the keyboard and the oscillators. Reference is now made to Fig. 2, showing an arrangement of this last-mentioned type. The contacts of the keys are connected to registering relays 601 to 609. Referring again to the preceding example, when the key 1 of the letter "F" is depressed, it closes the circuit of relays 602 and 605 via contact 28 of cam 29, the retarded common relay 30, the upper contacts of relays 602 and 605, the contacts of the key and the resting contact of relay 30. Relays 602 and 605 operate immediately, and hold up via their contacts that have been made, before the breaking of the circuits by movement of the character key.

They thus act to close the respective circuits of oscillators 202 and 205. A moment afterwards, relay 30 operates, and thereby excites electromagnet 3, which latter releases the key immediately. As soon as the lever 4 has lifted, it closes contact 31. The circuit of relay 32 is closed. This operates and holds up in operating position by its working contact, at the same time that it cuts out the circuit of the electromagnet 3, in order to secure the release of the locking bar.

Relays 602 and 605, and also relay 30, remain in the operating position as long as the shaft of the receiver has not begun to rotate. Consequently, the modulation frequencies generated by the oscillators 202 and 205 continue to be sent.

The depressed key having been released immediately, a second key can be depressed after the first one has lifted at any moment during the transmission of the first sign. It is locked because the circuit of the electromagnet is open, but it does not cause operation of the registering relays, because the circuit is opened at the rest contact of relay 30. As soon as contact 28 is opened, i. e., from the start of the rotation of the receiver shaft, all the relays 602, 605, 30, and 32 return to the respective resting positions, and the depressed key causes operation of the relays and the electromagnet 3, as has been previously explained.

Attention must be called to the fact that the system just described does not require any synchronism, even approximate between the corresponding instruments, and that the motors of the instruments may have any speed, the speed being limited only by the operating time of the relays in the local circuits. The selection elements may have any operating time, and this time transpires in common with the printing of the preceding character, so that the transmission speed of the normal teleprinter need be only very slightly reduced, if at all.

While there have been shown and described certain embodiments of this invention it is to be understood that many variations thereof will be apparent to those skilled in the art and accordingly the scope of this invention is limited only by the hereunto appended claims.

What is claimed as new and desired to be secured by Letters Patent of the United States, is:

1. A printing telegraph system comprising a first station, a plurality of sources of different frequencies at said first station, transmitter means at said first station, selector means at said first station adapted to apply the outputs of different combinations of said sources to said transmitter means for simultaneous transmission of selected frequency combinations, each selected combination representing a character reproduceable by a teleprinter, a second station, receiver means at said second station, a plurality of receiving devices each adapted to respond selectively to a respective one of said frequencies when received over said receiver means, the number of said devices corresponding to the number of sources at said first station, a plurality of translating devices, one for each of said combination of frequencies, switch means controlled by said receiving devices for actuating a respective translating device in accordance with the combination of frequencies received, a distributor at said second station, means including said distributor and said translating devices for translating each frequency combination into a train of teleprinter code impulses corresponding to a respective character, and printing means selectively responsive to said trains of impulses for printing said respective characters.

2. A printing telegraph system comprising a plurality of stations, each station comprising transmitter and receiver means, a plurality of sources of different frequencies, selector means adapted to apply the outputs of different combinations of said sources to said transmitter means for simultaneous transmission of selected frequency combinations, each selected combination representing a character reproduceable by a teleprinter, a plurality of receiving devices each adapted to respond selectively to a respective one of said frequencies when received over said receiver means, the number of said devices corresponding to the number of said sources, a plurality of translating devices, one for each of said combinations of frequencies, switch means controlled by said receiving devices for actuating a respective translating device in accordance with the combination of frequencies received, a distributor, means including said distributor and said translating devices for translating each frequency combination received into a train of teleprinter code impulses corresponding to a respective character, and printing means selectively responsive to said trains of impulses for printing said respective characters.

3. The system according to claim 2 wherein each station further comprises retransmission means selectively controllable by said translating devices for sending out a code combination corresponding to the translating device actuated, and blocking means actuatable by said selector means for disabling said retransmission means of a station during the original transmission of a combination of frequencies from the same station.

4. A printing telegraph system comprising a plurality of stations, each station comprising transmitter and receiver means, a plurality of sources of different frequencies, a plurality of keys each adapted to apply the outputs of a different combination of said sources to said transmitter means for simultaneous transmission of a selected frequency combination characteristic of the respective key, a plurality of receiving devices each adapted to respond selectively to a respective one of said frequencies when received over said receiver means, the number of said devices corresponding to the number of said sources, a plurality of translating devices, one for each key, switch means controlled by said receiving devices for actuating a respective translating device in accordance with the combination of frequencies received, a distributor, means including said distributor and said translating devices for translating each frequency combination received into teleprinter code impulses corresponding to a character represented by a respective key, printing means selectively responsive to said trains of code impulses for printing said character, retransmission means selectively controllable by said translating devices for sending out a code combination corresponding to the device actuated, and blocking means actuatable by said keys for disabling said retransmission means of a station during the original transmission of a combination of frequencies from the same station.

5. The system according to claim 4 wherein each translating device is a relay, said retransmission means comprising contacts of said relays arranged to apply the outputs of respective combinations of said sources to said transmitter means.

6. The system according to claim 4 wherein each station further comprises locking means adapted to hold each key actuated so as to cause continued transmission of a respective frequency combination by said transmitter means, and releasing means adapted to disable said locking means upon reception of a frequency combination retransmitted by another station.

7. The system according to claim 6 wherein said distributor means comprises a shaft and mechanism for rotating said shaft through one revolution in response to any frequency combination received, said shaft carrying cam means arranged to actuate said releasing means at the beginning of the rotation of said shaft.

8. The system according to claim 7 wherein said shaft carries further cam means arranged to disable said receiving devices as long as said shaft is in off-normal position.

9. A printing telegraph system comprising a plurality of stations, each station comprising transmitter and receiver means, a plurality of sources of different frequencies, a plurality of self-locking relays, a plurality of keys each adapted to apply the outputs of a different combination of said sources to said transmitter means over a respective one of said relays for simultaneous continuous transmission of a selected frequency combination characteristic of the respective key after the respective key has been restored to normal, a plurality of receiving devices each adapted to respond selectively to a respective one of said frequencies when received over said receiver means, the number of said devices corresponding to the number of said sources, a plurality of translating devices, one for each key, switch means controlled by said receiving devices for actuating a respective translating device in accordance with the combination of frequencies received, a distributor, means including said distributor and said translating devices for translating each frequency combination received into teleprinter code impulses corresponding to a character represented by a respective key, printing means selectively responsive to said trains of code impulses for printing said character, retransmission means selectively controllable by said translating devices for sending out a code combination corresponding to the device actuated, and blocking means actuatable by said keys for disabling said retransmission means of a station during the original transmission of a combination of frequencies from the same station.

10. The system according to claim 9 wherein said distributor means comprises a shaft and mechanism for rotating said shaft through one revolution in response to any frequency combination received, said shaft carrying cam means arranged to actuate said releasing means at the beginning of the rotation of said shaft.

11. The system according to claim 20 wherein said shaft carries further cam means arranged to disable said receiving devices as long as said shaft is in off-normal position.

LUCIEN DEVAUX.

REFERENCES CITED

The following references are of record in the file of this patent:

UNITED STATES PATENTS

| Number | Name | Date |
|---|---|---|
| 1,508,870 | Bennett | Sept. 16, 1924 |
| 1,805,867 | Compare | May 19, 1931 |
| 1,923,724 | Griffith | Aug. 22, 1933 |
| 1,960,021 | McWhirter | May 22, 1934 |
| 2,139,079 | Haselton | Dec. 6, 1938 |
| 2,354,534 | Mason | July 25, 1944 |